| (12) | United States Patent | (10) Patent No.: | US 8,693,134 B1 |
|---|---|---|---|
| | Xi et al. | (45) Date of Patent: | Apr. 8, 2014 |

(54) ALTERNATING WEDGE REPEATABLE RUNOUT (WRRO) PATTERN

(75) Inventors: Wei Xi, Mission Viejo, CA (US); Sanghoon Chu, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 217 days.

(21) Appl. No.: 13/167,062

(22) Filed: Jun. 23, 2011

(51) Int. Cl.
*G11B 5/596* (2006.01)
*G11B 5/09* (2006.01)

(52) U.S. Cl.
USPC .......................................... 360/77.04; 360/48

(58) Field of Classification Search
None
See application file for complete search history.

(56) References Cited

U.S. PATENT DOCUMENTS

| 6,775,091 | B1 | 8/2004 | Sutardja |
| 6,999,266 | B1 * | 2/2006 | Schmidt ..................... 360/77.04 |
| 7,082,007 | B2 | 7/2006 | Liu et al. |
| 7,133,241 | B2 | 11/2006 | Che et al. |
| 7,486,460 | B2 | 2/2009 | Tsuchinaga et al. |
| 7,564,637 | B2 * | 7/2009 | Kudo et al. ..................... 360/48 |
| 7,675,700 | B2 * | 3/2010 | Takeda et al. ................... 360/48 |
| 2002/0109933 | A1 * | 8/2002 | Ashikaga et al. .......... 360/77.04 |
| 2005/0071537 | A1 | 3/2005 | New et al. |
| 2006/0232874 | A1 | 10/2006 | Tsuchinaga et al. |
| 2007/0223132 | A1 | 9/2007 | Tsuchinaga |

\* cited by examiner

*Primary Examiner* — Andrew L Sniezek

(57) ABSTRACT

A disk drive is disclosed comprising a disk, a head actuated over the disk, and a controller. The disk comprises a plurality of data tracks and a plurality of servo wedges, wherein each servo wedge comprises a plurality of wedge repeatable runout (WRRO) fields in a circumferential direction, each of the plurality of WRRO fields including an WRRO compensation value for a different one of the data tracks and having a width that is wider than a width of the respective data track in a radial direction. The controller is configured to read the WRRO compensation value in at least one of the WRRO fields from the disk using the head, and to adjust a position of the head based on the read WRRO compensation value.

20 Claims, 10 Drawing Sheets

| Track 1 Preamble | Track 1 W1 | Track 1 W2 |
|---|---|---|
| Track 2 Preamble | Track 2 W1 | Track 2 W2 |
| Track 3 Preamble | Track 3 W1 | Track 3 W2 |
| Track 4 Preamble | Track 4 W1 | Track 4 W2 |
| Track 5 Preamble | Track 5 W1 | Track 5 W2 |
| Track 6 Preamble | Track 6 W1 | Track 6 W2 |

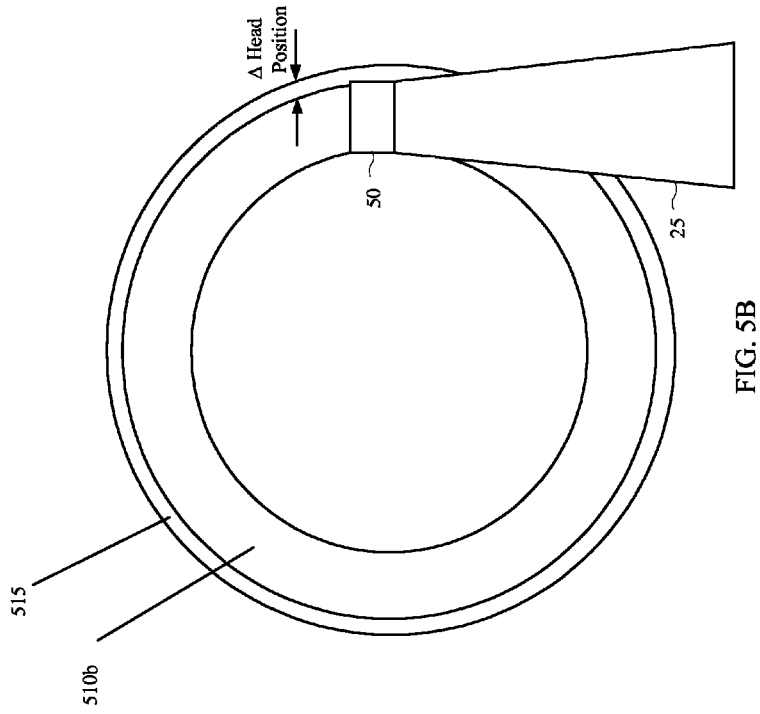
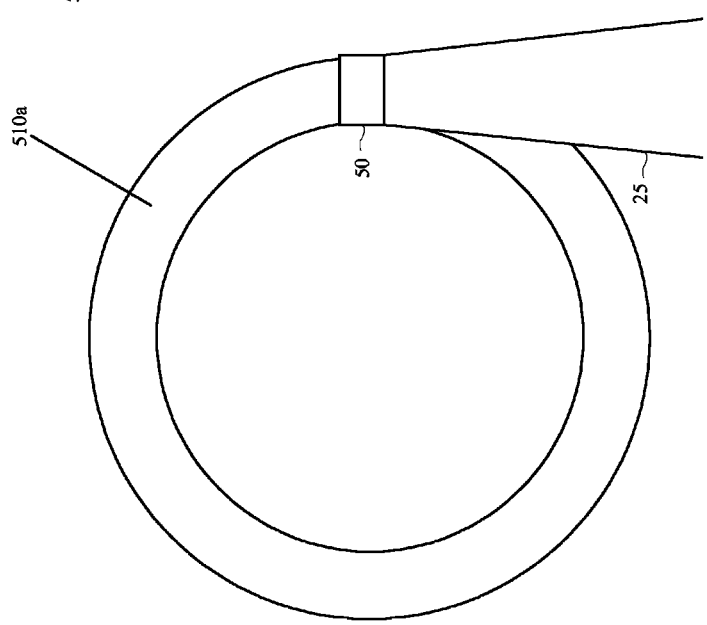

ALTERNATING WEDGE REPEATABLE RUNOUT (WRRO) PATTERN

CROSS-REFERENCE TO RELATED APPLICATIONS

The present application claims priority from co-pending provisional U.S. Patent Application Ser. No. 61/378,898, filed on Aug. 31, 2010, the specification of which is incorporated herein by reference.

BACKGROUND

A disk drive comprises a rotating disk and a head actuated over the disk to magnetically write to and read data from the disk. The head may be connected to a distal end of an actuator arm that is rotated about a pivot to position the head radially over the disk. The disk may comprise a plurality of radially spaced data tracks, where each data track is partitioned into data sectors. The disk may also comprise a plurality of angularly spaced servo wedges, where each servo wedge may include a servo sector for each data track providing embedded servo information for the track. The servo information may include a pattern of alternating magnetic transitions (servo burst), which can be read from the disk by the head and processed by a servo controller to determine the position of the head over the disk. The servo sectors may be written on the disk using an external servo writer. Alternatively, a disk drive may self-write the servo sectors on the disk using any suitable technique, such as propagation or while following seed tracks, such as spiral tracks.

Regardless of how the servo sectors are written on the disk, errors may occur in the servo writing process resulting in the servo sectors defining eccentric tracks that deviate from concentric circular tracks. In addition, eccentricity may be caused by the disk being clamped to the spindle motor off center and/or the disk slipping after being clamped to the spindle motor. The eccentricity may be referred to as repeatable runout (RRO) since the position error relative to the head repeats each time the disk rotates.

To compensate for repeatable runout associated with a track, RRO compensation values may be generated for the track and written in the servo sectors for the track. The RRO compensation values written in the servo sectors (also referred to as wedge RRO (WRRO)) for a particular track may later be read from the disk and processed by a servo controller to adjust the head position accordingly to compensate for the repeatable runout.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 4 shows an example of the WRRO fields in the conventional WRRO layout;

FIGS. 5A and 5B show an example of shingle writing;

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
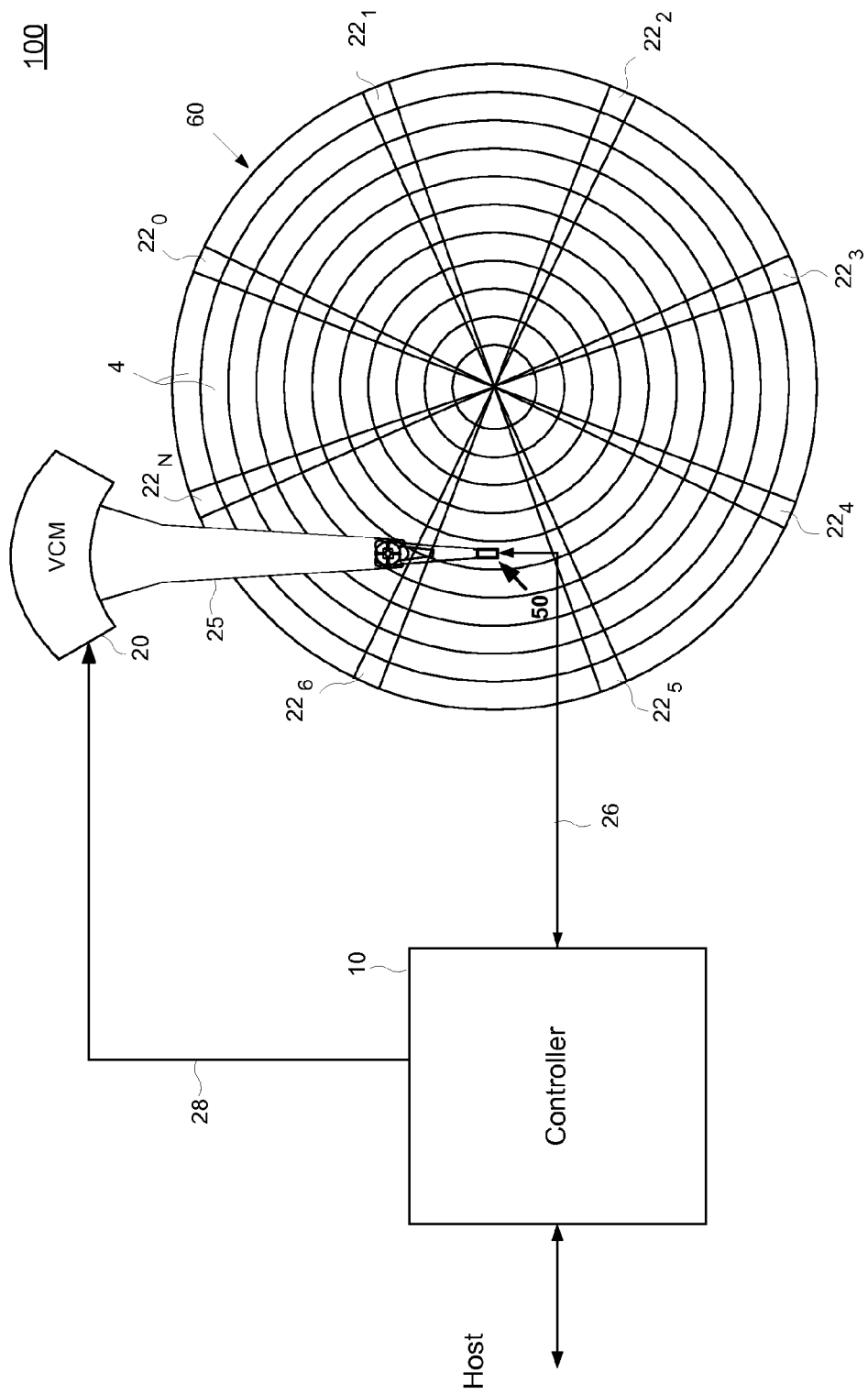
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk drive 100 also includes a spindle motor (not shown) for rotating the disk 60 during read/write operations.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk 60 comprises a number of radially spaced data tracks 4. Each track 4 may be divided into a number of data sectors (not shown) that are spaced circumferentially along the track 4. User data and/or other information may be stored in the data sectors.

To write data to the disk 60, the controller 10 may first position the head 50 over a desired track 4 on the disk 60. The controller 10 processes data to be written to the disk 60 into a write signal 26, which is outputted to the head 50. The head 50 converts the write signal 26 into a magnetic field that magnetizes the surface of the disk 60 based on the write signal, thereby magnetically writing the data on the disk 60.

To read data from the disk 60, the controller 10 positions the head 50 over a desired track 4 on the disk 60. The head 50 generates a read signal based on the magnetization of the disk surface under the head 50. The controller 10 receives and processes the read signal 26 into data, thereby reading the data from the disk 60.

The disk 60 may also comprise a plurality of angularly spaced servo wedges $22_0$-$22_N$, where each servo wedge may include a servo sector for each data track 4 providing embedded servo information for the track. The servo information for each track may include a pattern of alternating magnetic transitions (servo burst), which may be read from the disk 60 by the head 50 and processed by the controller 10 to determine the position of the head 50 relative to the corresponding track 4. Each servo sector may also include wedge repeatable runout (WRRO) compensation values to compensate for repeatable runout. The angular spacing between the servo wedges $22_0$-$22_N$ may be uniform, as shown in the example in FIG. 1.

Figure 2:
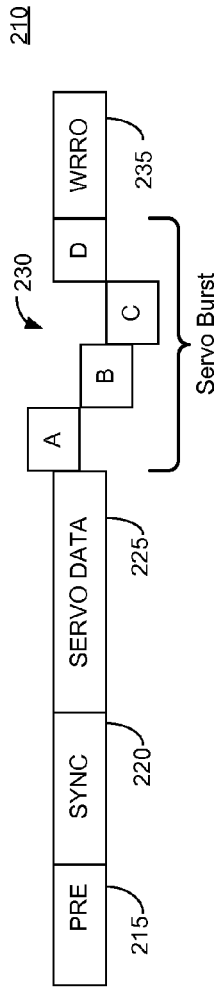
FIG. 2 shows an example of a servo sector.

FIG. 2 shows an example of a servo sector 210 in a servo wedge $22_0$-$22_N$ for a track 4. The servo sector 210 may include a preamble field 215, a servo synch mark field 220, and a servo data field 225, which may include track identification and/or other data. The servo sector 210 also may include a servo burst field 230 comprising a pattern of alternating magnetic transitions that are read by the head 50 and processed by the controller 10 to determine the head position relative to the corresponding track 4. The servo sector 210 may further include a WRRO field 235 comprising one or more WRRO compensation values that are read by the head 50 and processed by the controller 10 to compensate for repeatable runout associated with the track.

The controller 10 may use the servo information in the servo wedges $22_0$-$22_N$ to keep the head 50 on a desired track during track following. To do this, the controller 10 may read servo information (e.g., servo burst) each time the head 50 passes over a servo wedge $22_0$-$22_N$, process the read servo information to determine the position of the head 50, and generate a position error signal (PES) indicating the deviation of the head position from the desired track 4. The controller 10 may also read the WRRO compensation values from the servo wedges $22_0$-$22_N$ to compensate for repeatable runout associated with the track. The controller 10 may then generate a control signal 28 based on the PES and the WRRO compensation values and output the control signal 28 to the VCM 20 to adjust the head position in a direction that keeps the head 50 on track.

Figure 3:
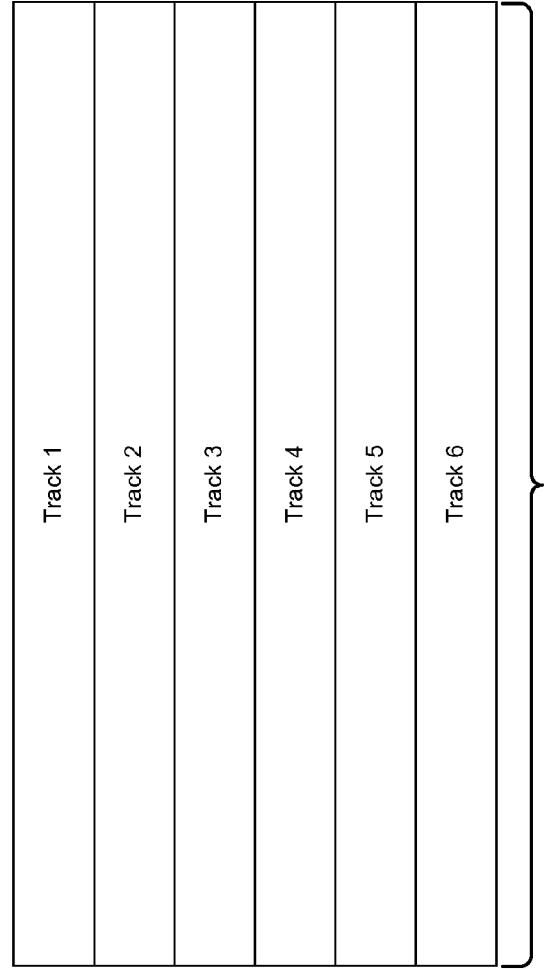
FIG. 3 shows an example of a conventional WRRO layout on a disk.

FIG. 3 illustrates an example of a conventional WRRO layout on a disk. More particularly, FIG. 3 shows an example of data fields for six data tracks labeled Track 1 to Track 6. The data field for each track includes one or more data sectors and corresponds to a portion of the track between adjacent servo wedges. FIG. 3 also shows an example of six WRRO fields 335-1 to 335-6, where each WRRO field 335-1 to 335-6 corresponds to one of the data tracks in FIG. 3. Each WRRO field 335-1 to 335-6 may include one or more WRRO compensation values to compensate for repeatable runout for the corresponding data track. For example, WRRO field 335-1 may include one or more WRRO compensation values for Track 1. The WRRO fields 335-1 to 335-6 shown in FIG. 3 are located in a servo wedge.

In the conventional WRRO layout, each WRRO field 335-1 to 335-6 has a width that is equal to the width of the corresponding track in the radial direction. In the example shown in FIG. 3, each WRRO field 335-1 to 335-6 is centered with the corresponding track in the radial direction. A WRRO field 335-1 to 335-6 may be centered with or offset from the corresponding track in the radial direction depending on whether the WRRO field includes read WRRO compensation values or write WRRO compensation values, as discussed further below.

Read WRRO compensation values are used to compensate for repeatable runout for a track during a read operation. An WRRO field including read compensation values may be centered with the corresponding track because the same reader of the head 50 may be used to both read the read WRRO compensation values from the WRRO field and read data from the corresponding track.

Write WRRO compensation values are used to compensate for repeatable runout for a track during a write operation. An WRRO field including write WRRO compensation values may be offset from the corresponding track because the reader of the head 50 used to read the write WRRO compensation values from the WRRO field is offset from the writer of the head 50 used to write data on the corresponding track. In this example, the WRRO field may be offset from the corresponding track in the radial direction to account for the reader/writer offset.

Read and write WRRO compensation values may be written on the disk in alternating servo wedges. For example, read WRRO fields including read WRRO compensation values may be written in odd servo wedges, and write WRRO fields including write WRRO compensation values may be written in even servo wedges. In this example, each read WRRO field may include read WRRO compensation values for a portion of the corresponding track extending to the next two servo wedges. This is because the read WRRO fields for a track are written in every other servo wedge. Similarly, each write WRRO field may include write WRRO compensation values for a portion of the corresponding track extending to the next two servo wedges. In the disclosure, WRRO field may refer to either a read WRRO field or a write WRRO field.

FIG. 4 shows an example of the WRRO fields 335-1 to 335-6 in the conventional WRRO layout in more detail. As shown in FIG. 4, each WRRO field 335-1 to 335-6 may include a WRRO preamble and two WRRO compensation values W1 and W2. The two WRRO compensation values W1 and W2 provide WRRO compensation for a portion of the corresponding track extending to the next two servo wedges, as discussed above. The WRRO preamble for each WRRO field 335-1 to 335-6 provides timing information that allows the controller 10 to synchronize with the timing of the bits of the WRRO compensation values W1 and W2 in order to read the WRRO compensation values W1 and W2. The WRRO preamble should not be confused with the preamble 215 of the corresponding servo sector.

Before describing WRRO layouts according to various embodiments of the present invention, it may be instructive to discuss shingle writing, which allows the head 50 to write narrower tracks 4 without having to reduce the dimensions of the head 50.

An example of shingle writing is illustrated in FIGS. 5A-5B, which show the progression of a shingle write on the disk 60. In FIG. 5A, the head 50 writes data to the disk 60 in a first wide circular band 510*a*. In FIG. 5B, the head 50 is offset by a small amount from its position in FIG. 5A. The head 50 then writes subsequent data to the disk 60 in a second wide circular band 510*b*. The second wide circular band 510*b* overlaps and overwrites most of the first wide circular band 510*a*, leaving a narrow portion of the wide first circular band 510*a* that defines a narrow track 515. This process may be repeated to write a sequence of data on the disk 60. The width of the track 515 in shingle writing may be defined by the offset of the head position (A head position in FIG. 5B) between consecutive track writes. In shingle writing, data is typically sequentially written to the disk 60 in one direction (from the outer diameter (OD) to the inner diameter (ID) of the disk 60 or the opposite direction).

Thus, shingle writing allows the disk drive 100 to write narrower tracks for given head dimensions. This allows the disk drive 100 to achieve much higher tracks per inch (TPI) and therefore increase the storage capacity of the disk 60. However, the narrow tracks increase the effects of adjacent track interference (ATI) on data integrity. As a result, a track may be written only once or a limited number of times to ensure a certain level of data integrity. This constraint may severely impact the WRRO off track read capability (OTRC) of the disk drive 100 using the conventional WRRO layout. This is because WRRO values may be written on a track multiple times during WRRO retry, which increases data degradation due to ATI.

Figure 6:
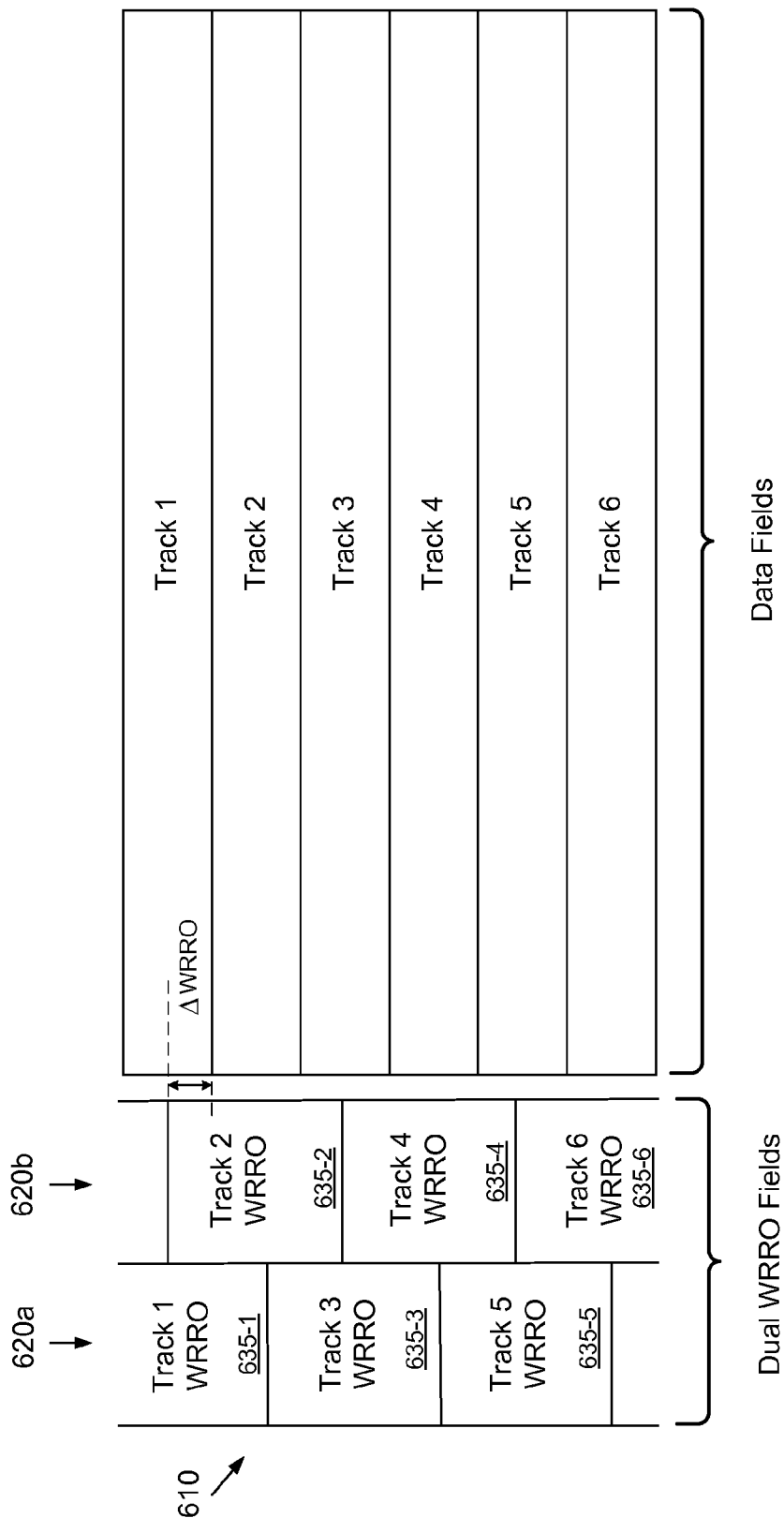
FIG. 6 shows an alternating WRRO layout according to an embodiment of the present invention.

FIG. 6 shows an alternating WRRO layout 610 according to an embodiment of the present invention that may be used to improve the WRRO OTRC of a disk drive. The alternating WRRO layout 610 is shown for one servo wedge in FIG. 6. The WRRO layout 610 comprises a first set of WRRO fields 620*a* and a second set of WRRO fields 620*b*, in which the first set of WRRO fields 620*a* is offset from the second set of WRRO fields 620*b* in a circumferential direction of the disk. Each set of WRRO fields 620*a* and 620*b* may include WRRO fields arranged along a radial direction of the disk, as shown in the example in FIG. 6.

The first and second sets of WRRO fields 620*a* and 620*b* may each include WRRO fields for every other track. For example, the first set of WRRO fields 620*a* may include WRRO fields 635-1, 635-3 and 635-5 for odd tracks, and the second set of WRRO fields 530 may include WRRO fields 635-2, 635-4 and 635-6 for even tracks, as shown in FIG. 6. Thus, in this example, each set of WRRO fields 620*a* and 620*b* includes WRRO fields for half of the data tracks. This allows the WRRO fields in each set to have a width that is wider than the width of the corresponding track in the radial direction. In the example shown in FIG. 6, each WRRO field has a width that is approximately twice the width of the corresponding track in the radial direction. The wider WRRO field width in the radial direction increases the WRRO OTRC of the disk drive 100. Also, the first set of WRRO fields 620*a* is radially offset from the second set of WRRO fields 620*b* by one track width in the example in FIG. 6.

Although the WRRO field width is approximately twice the track width in the example in FIG. 6, it is to be appreciated that WRRO field width may be any width that is wider than the track width. For example, each WRRO field may have a width that is 25% to 100% greater than the width of the corresponding track. For the example where the WRRO field width is less than twice the track width, there may be a space between adjacent WRRO fields in the same set.

Each WRRO field may be centered with the corresponding track in the radial direction. For example, in FIG. 6, WRRO field 635-2 is approximately centered with Track 2 in the radial direction. Similarly, WRRO field 635-3 is approximately centered with Track 3 in the radial direction. In this example, the WRRO fields may comprise read WRRO fields. For the example where the WRRO fields comprise write WRRO fields, the WRRO fields may be offset from the corresponding tracks in the radial direction by a reader/writer offset, as discussed above.

FIG. 6 shows the write offset (Δ WRRO) in the radial direction between an WRRO field and the corresponding track. The write offset may correspond to the offset between the head position for writing the WRRO field and the head position for writing the corresponding track. In the example shown in FIG. 6, the write offset is approximately equal to half a track width. For the example of write WRRO fields, the write offset may be adjusted to account for reader/writer offset, as discussed above. The write offset (Δ WRRO) may also be adjusted, for example, based on the write offset that achieves the best WRRO OTRC for a given WRRO field width.

Thus, the alternating WRRO layout allows the WRRO fields 635-1 to 635-6 to have wider widths in the radial direction while allowing the data tracks to remain narrow for increased data storage capacity. The wider widths of the WRRO fields 635-1 to 635-6 increase the WRRO OTRC of the disk drive 100, thereby increasing the likelihood that the controller 10 accurately reads the WRRO compensation values from the WRRO fields. The read WRRO compensation values allow the controller 10 to compensate for repeatable runout, keeping the head 50 on track.

Figure 7:
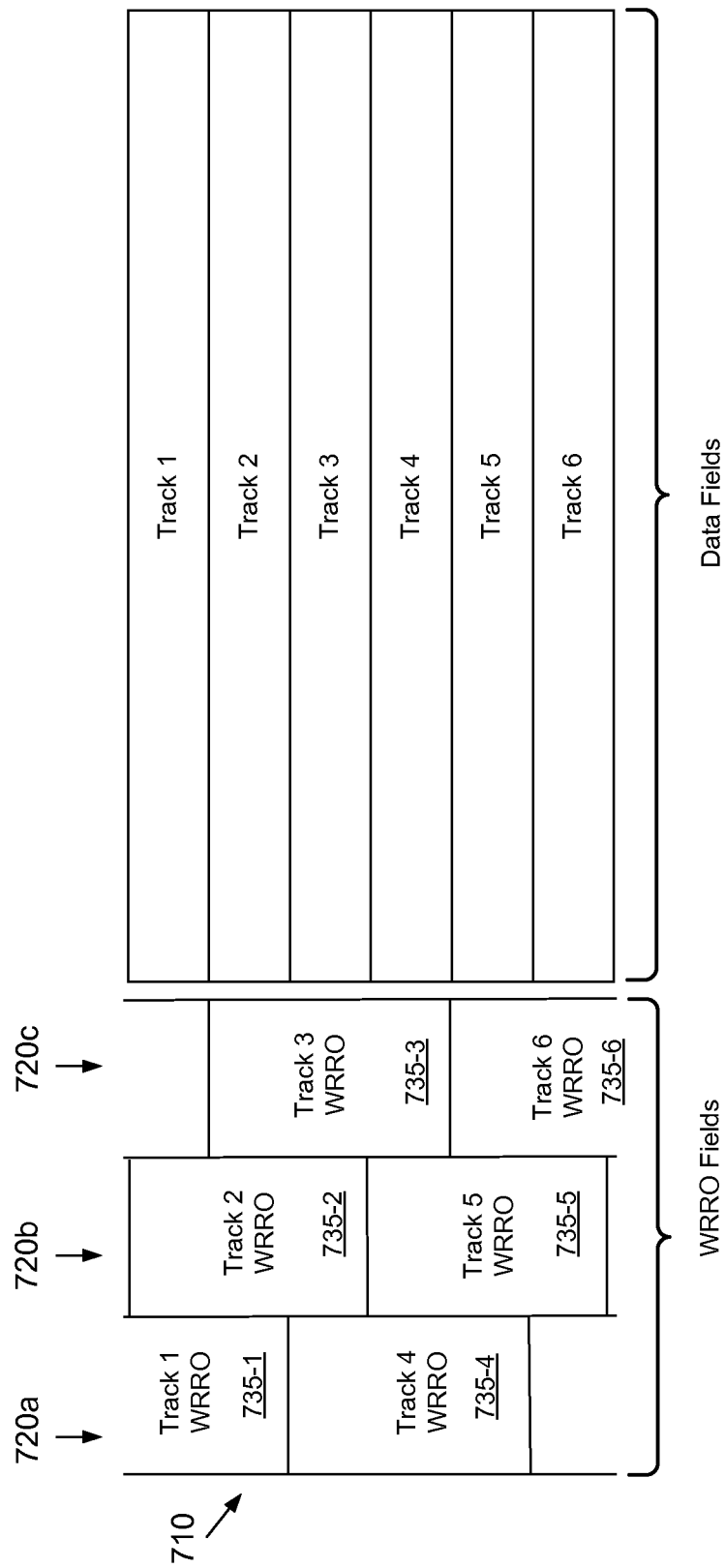
FIG. 7 shows an alternating WRRO layout according to another embodiment of the present invention.

FIG. 7 shows an alternating WRRO layout 710 according to an embodiment of the present. The alternating WRRO layout 710 is shown for one servo wedge in FIG. 7. The WRRO layout 710 comprises a first set of WRRO fields 720*a*, a second set of WRRO fields 720*b*, and a third set of WRRO fields 720*c* that are offset from one another in the circumferential direction. The first, second and third sets of WRRO fields 720*a*, 720*b* and 720*c* may each include WRRO fields for every third track. In the example shown in FIG. 7, the first set of WRRO fields 720*a* includes WRRO fields 735-1 and 735-4 for the tracks labeled Track 1 and Track 4, the second set of WRRO fields 720*b* includes WRRO fields 735-2 and 735-5 for the tracks labeled Track 2 and Track 5, and the third set of WRRO fields 720*c* includes WRRO fields 735-3 and 735-6 for the tracks labeled Track 3 and Track 6. Thus, in this example, each set of WRRO fields 720*a*, 720*b* and 720*c* includes WRRO fields for a third of the data tracks. This allows the WRRO fields in each set to have a wider width than the corresponding track in the radial direction. In the example shown in FIG. 7, each WRRO field has a width that is approximately three times the width of the corresponding track in the radial direction. The wider widths of the WRRO fields in the radial direction increases the WRRO OTRC of the disk drive 100.

The alternating WRRO layout 610 in the example in FIG. 7 allows the width of the WRRO fields to be wider (up to three track widths), thereby increasing the WRRO OTRC of the disk. A tradeoff of the increased WRRO OTRC is reduced format efficiency because more space is needed on the disk 60 for the wider WRRO fields.

An alternating WRRO layout according to various embodiments of the invention may include WRRO fields of any width. For a general case, the alternating WRRO layout for each servo wedge may comprise M sets of WRRO fields arranged in the circumferential direction of the disk, where each WRRO field has a width of up to M track widths in the radial direction of the disk. Each of the M sets of WRRO fields may include WRRO fields for 1/M of the tracks. The WRRO compensation values for Track K may be located in the mod (K, M) WRRO field in the corresponding set of WRRO fields.

Figure 8:
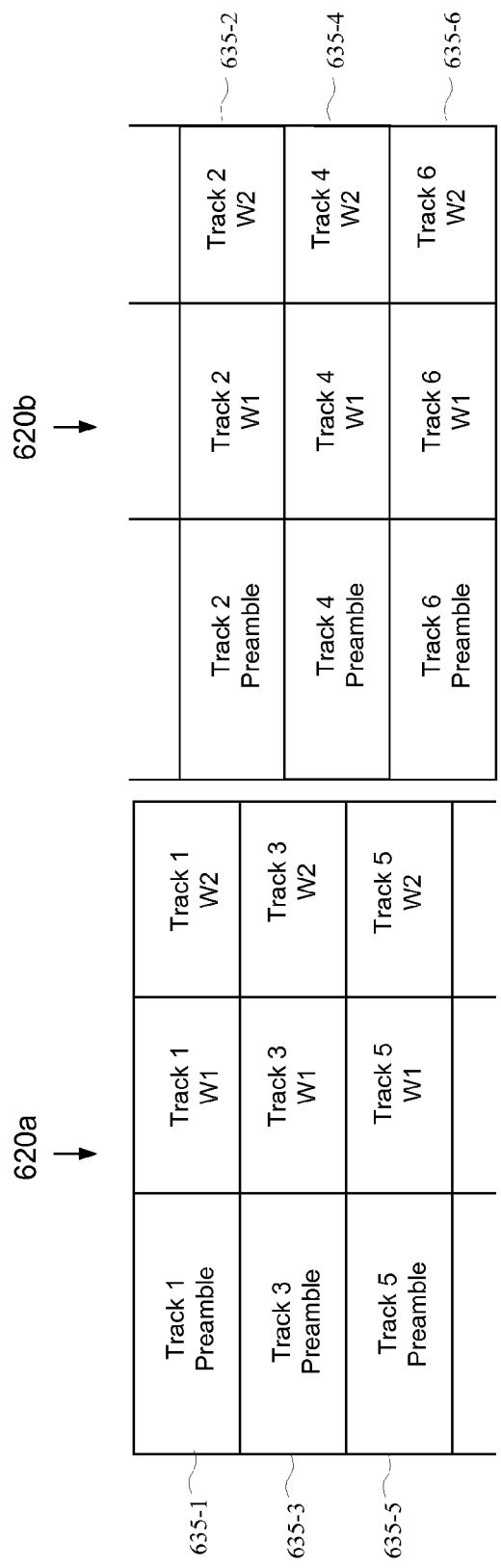
FIG. 8 shows an alternating WRRO layout with separate preambles for each WRRO field according to an embodiment of the present invention.

FIG. 8 shows an example of the WRRO fields 635-1 to 635-6 in the dual alternating WRRO layout according to an embodiment of the present invention. As shown in FIG. 8, each WRRO field 635-1 to 635-6 may include a WRRO preamble and two WRRO compensation values W1 and W2. The two WRRO compensation values W1 and W2 provide WRRO compensation for a portion of the corresponding track extending to the next two servo wedges, as discussed above. The preamble for each WRRO field 635-1 to 635-6 provides timing information that allows the controller 10 to synchronize with the timing of the bits of the WRRO compensation values W1 and W2 in order to read the WRRO compensation values W1 and W2. In this embodiment, each WRRO field 635-1 to 635-6 has a separate preamble.

The WRRO fields 635-1 to 635-6 may be written using shingle or non-shingle writing. For example, the WRRO fields 635-1 to 635-6 and the tracks may both be written using shingle writing. As discussed above, the offset of the head position between consecutive track writes determines the width of a track in shingle writing. In this example, the width of the WRRO fields 635-1 to 635-6 may be made wider than the width of the tracks by using a larger head offset for the shingle writing of the WRRO fields.

Figure 9:
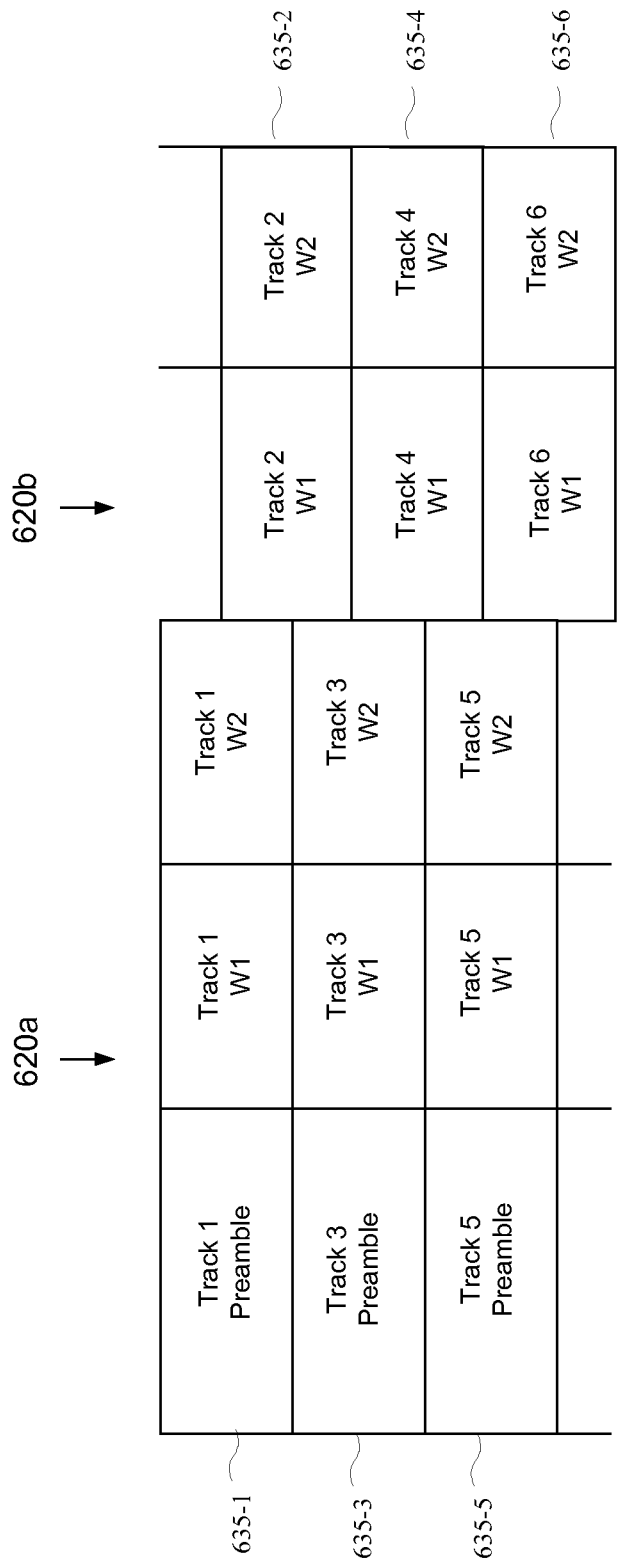
FIG. 9 shows an alternating WRRO layout with shared preambles according to an embodiment of the present invention.

FIG. 9 shows an example of the WRRO layout with shared preambles to reduce servo overhead according to an embodiment of the present invention. In this embodiment, the WRRO layout comprises one WRRO preamble for each pair of WRRO fields 635-1 to 635-6 instead of a separate WRRO preamble for each WRRO field 635-1 to 635-6. In the example shown in FIG. 9, when the controller 10 reads WRRO field 635-2 for Track 2, the controller 10 may read either the WRRO preamble in WRRO field 635-1 or WRRO field 635-3 for timing information to read the WRRO compensation values W1 and W2 in WRRO field 635-2. Which WRRO preamble is read may depend on the direction the head 50 is offset from the centerline of Track 2. The timing information in WRRO fields 635-1 to 635-3 may be close to the timing of the WRRO compensation values W1 and W2 in WRRO field 635-2 so that the WRRO preamble in either WRRO field 635-1 and 635-3 can be use to provide timing for WRRO field 635-2. The shared preambles reduce the space needed on the disk for the WRRO field, thereby reducing servo overhead compared with the case where each WRRO field has a separate WRRO preamble.

Figure 10:
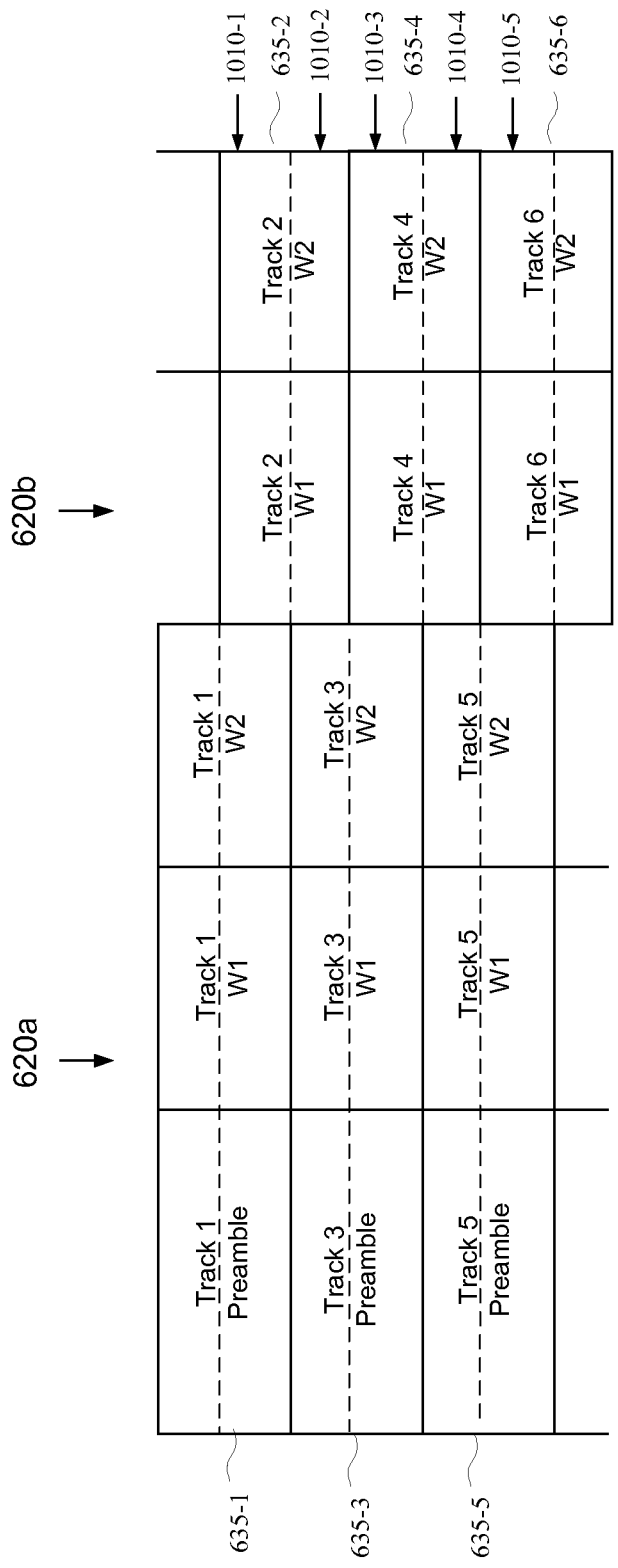
FIG. 10 shows an example of writing an alternating WRRO layout according to an embodiment of the present invention.

The WRRO fields 635-1 to 635-6 may be written using shingle writing. An example of this is shown in FIG. 10. In this example, the WRRO layout is written in bands 1010-1 to 1010-5 that are sequentially written on the disk 60 in the radial direction, in which the head 50 is offset by a small amount between writes for adjacent bands 1010-1 to 1010-6. For each band, the head 50 may write a portion of a WRRO field in the first set 620a and a portion of a WRRO field in second set 620b. For example, for band 1010-1, the head 50 writes a bottom portion of WRRO field 635-1 and a top portion of WRRO field 635-2, for band 1010-2, the head 50 writes a top portion of WRRO field 635-3 and a bottom portion of WRRO field 635-2, and so on.

Figure 11:
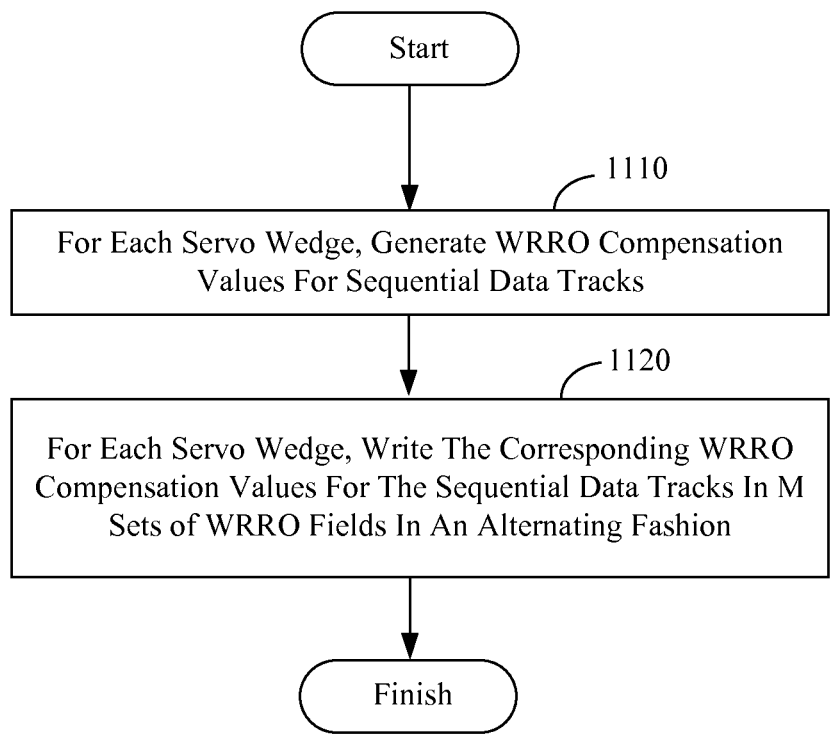
FIG. 11 is a flow diagram showing a method of servo writing a disk according to an embodiment of the present invention.

FIG. 11 is a flow diagram of a method of servo writing a disk comprising a plurality of data tracks 4 and servo wedges $22_0$-$22_N$ according to an embodiment of the present invention.

In step 1110, for each servo wedge, WRRO compensation values are generated for sequential data tracks (e.g., Tracks 1 to Tracks 6 shown in FIG. 6). The WRRO compensation values may be determined in a learning process or any suitable technique known in the art.

In step 1120, for each servo wedge, the corresponding WRRO compensation values for the sequential data tracks are written in M sets of WRRO fields in an alternating fashion. For the example of the dual alternating WRRO layout shown in FIG. 6, the WRRO compensation values for the odd tracks may be written to the first set of WRRO fields 620a and the WRRO compensation values for the even tracks may be written to the second set of WRRO fields 620b. For the example of the alternating WRRO layout shown in FIG. 7, the WRRO compensation values for the sequential data tracks may be written to the first, second and third sets of WRRO fields 720a, 720b and 720c in an alternating fashion. In this example, each set of WRRO fields 720a, 720b and 720c receives WRRO compensation values for every third data track.

The M sets of WRRO fields in a servo wedge may be arranged in a circumferential direction of the disk so that each set is offset from the other sets in the circumferential direction. The WRRO fields in each set may be arranged along the radial direction of the disk, as shown in the examples in FIGS. 6 and 7.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
   a disk comprising a plurality of data tracks and a plurality of servo wedges, wherein each servo wedge comprises a plurality of wedge repeatable run out (WRRO) fields in a circumferential direction, each of the plurality of WRRO fields including a WRRO compensation value for a different one of the data tracks such that there is one WRRO field per data track, and having a width that is wider than a width of the respective data track in a radial direction;
   a head actuated over the disk; and
   a controller configured to read the WRRO compensation value in at least one of the WRRO fields from the disk using the head, and to adjust a position of the head based on the read WRRO compensation value.

2. The disk drive of claim 1, wherein the WRRO fields in each servo wedge are offset from one another in the radial direction.

3. The disk drive of claim 2, wherein each WRRO field in each servo wedge is
   approximately centered with the respective data track in the radial direction.

4. The disk drive of claim 1, wherein the WRRO fields in each servo wedge comprise M sets of WRRO fields and each of the WRRO fields has a width that is approximately M times greater than a width of a data track in the radial direction where M is an integer greater than or equal to two.

5. The disk drive of claim 1, wherein each WRRO field in each servo wedge has a width that is at least 25 percent greater than a width of the respective data track in the radial direction.

6. The disk drive of claim 1, wherein each WRRO field in each servo wedge has a width that is at least twice the width of the respective data track in the radial direction.

7. The disk drive of claim 1, wherein each WRRO field is offset from the respective track in the radial direction to optimize off track read capacity (OTRC) of the WRRO field.

8. A disk drive, comprising:
   a disk comprising a plurality of data tracks and a plurality of servo wedges, wherein each servo wedge comprises M Sets of wedge repeatable run out (WRRO) fields arranged in a circumferential direction such that there is one WRRO field per data track, wherein WRRO compensation values for sequential data tracks are written in the M Sets of WRRO fields in an alternating fashion, wherein M is an integer greater than or equal to two;
   a head actuated over the disk; and
   a controller configured to read the WRRO compensation value in at least one of the WRRO fields from the disk using the head, and to adjust a position of the head based on the read WRRO compensation value.

9. The disk drive of claim 8, wherein the M sets of WRRO fields in each servo wedge are offset from one another other in a radial direction.

10. The disk drive of claim 9, wherein each WRRO field in each servo wedge is
    approximately centered with the respective data track in the radial direction.

11. The disk drive of claim 8, wherein each WRRO field in each servo wedge has a width that is approximately 25 percent greater than a width of a data track in a radial direction.

12. The disk drive of claim 8, wherein each WRRO field in each servo wedge has a width that is approximately twice a width of a data track in a radial direction.

13. The disk drive of claim 8, wherein each WRRO field is offset from the respective track in a radial direction to optimize off track read capacity (OTRC) of the WRRO field.

14. A method of servo writing a disk comprising a plurality of data tracks and a plurality of servo wedges, the method comprising:
    for each servo wedge, generating wedge repeatable run out (WRRO) compensation values for sequential data tracks; and
    for each servo wedge, writing the corresponding WRRO compensation values for the sequential data tracks in M sets of WRRO fields in an alternating fashion such that there is one WRRO field per data track, wherein the M sets are arranged in a circumferential direction of the disk, wherein M is an integer greater than or equal to two.

15. The method of claim 14, wherein the M sets of WRRO fields in each servo wedge are offset from each other in a radial direction.

16. The method of claim 15, wherein each WRRO field in each servo wedge is
    approximately centered with the respective data track in the radial direction.

17. The method of claim 14, wherein each WRRO field in each servo wedge has a width that is approximately 25 percent greater than a width of a data track in a radial direction.

18. The method of claim 14, wherein each WRRO field in each servo wedge has a width that is approximately twice a width of a data track in a radial direction.

19. A disk drive, comprising:
    a disk comprising a plurality of data tracks and a plurality of servo wedges, wherein each
    servo wedge comprises a plurality of wedge repeatable run out (WRRO) fields in a circumferential direction, each of the plurality of WRRO fields including a WRRO compensation value for a different one of the data tracks and having a width that is wider than a width of the respective data track in a radial direction, wherein the WRRO fields in each servo wedge share a common preamble field corresponding to the WRRO fields;
    a head actuated over the disk; and
    a controller configured to read the WRRO compensation value in at least one of the WRRO fields from the disk using the head, and to adjust a position of the head based on the read WRRO compensation value.

20. The disk drive of claim 19, wherein the preamble field includes timing information.

* * * * *